April 20, 1965  R. DAIGLE  3,179,452
CONVEYOR TRACK AND DRIVE ASSEMBLY
Filed Dec. 7, 1962  3 Sheets-Sheet 1

INVENTOR.
RALPH DAIGLE
BY Cullen, Sloman & Cantor
ATTORNEYS

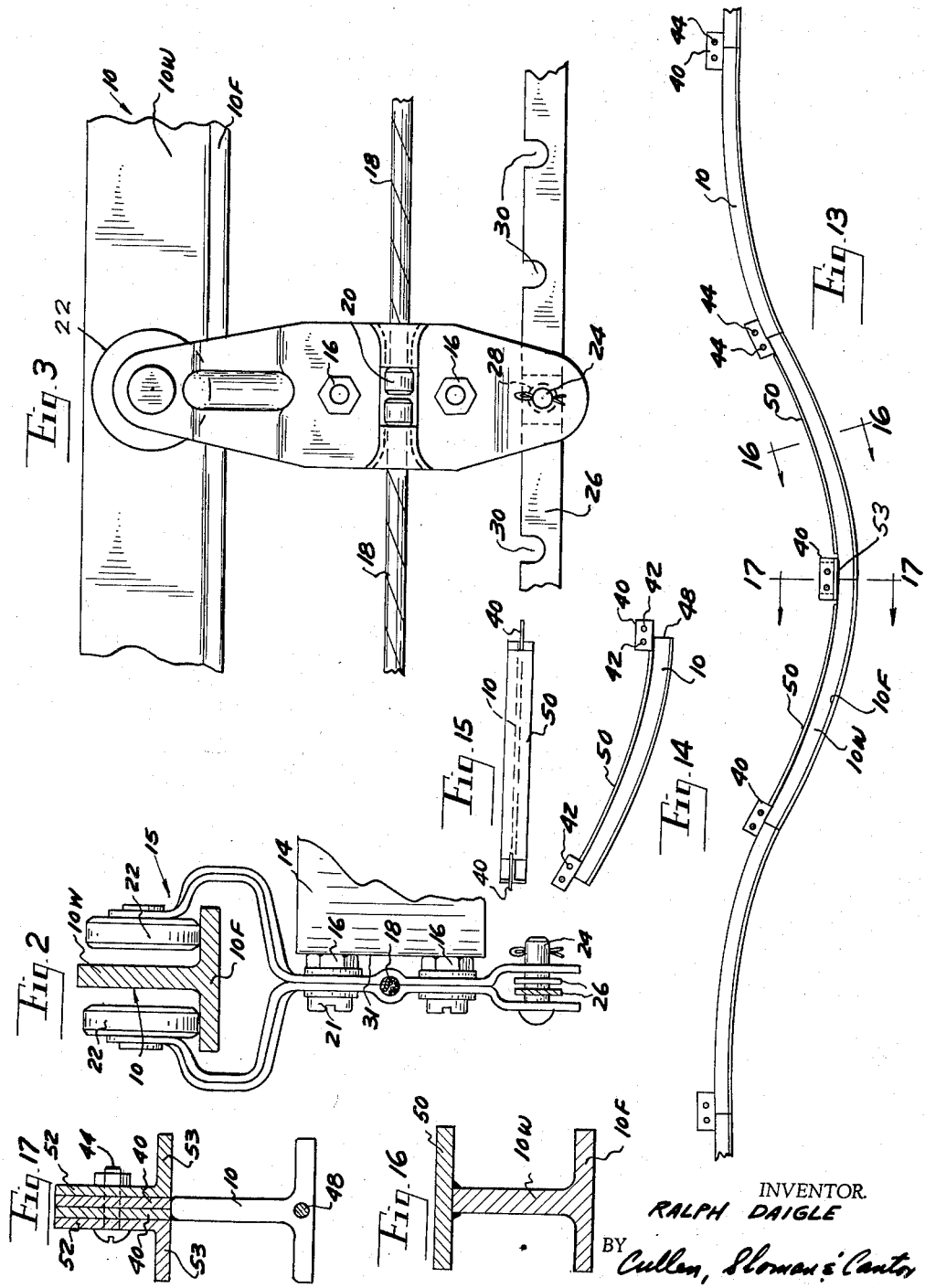

April 20, 1965 R. DAIGLE 3,179,452
CONVEYOR TRACK AND DRIVE ASSEMBLY
Filed Dec. 7, 1962 3 Sheets-Sheet 3
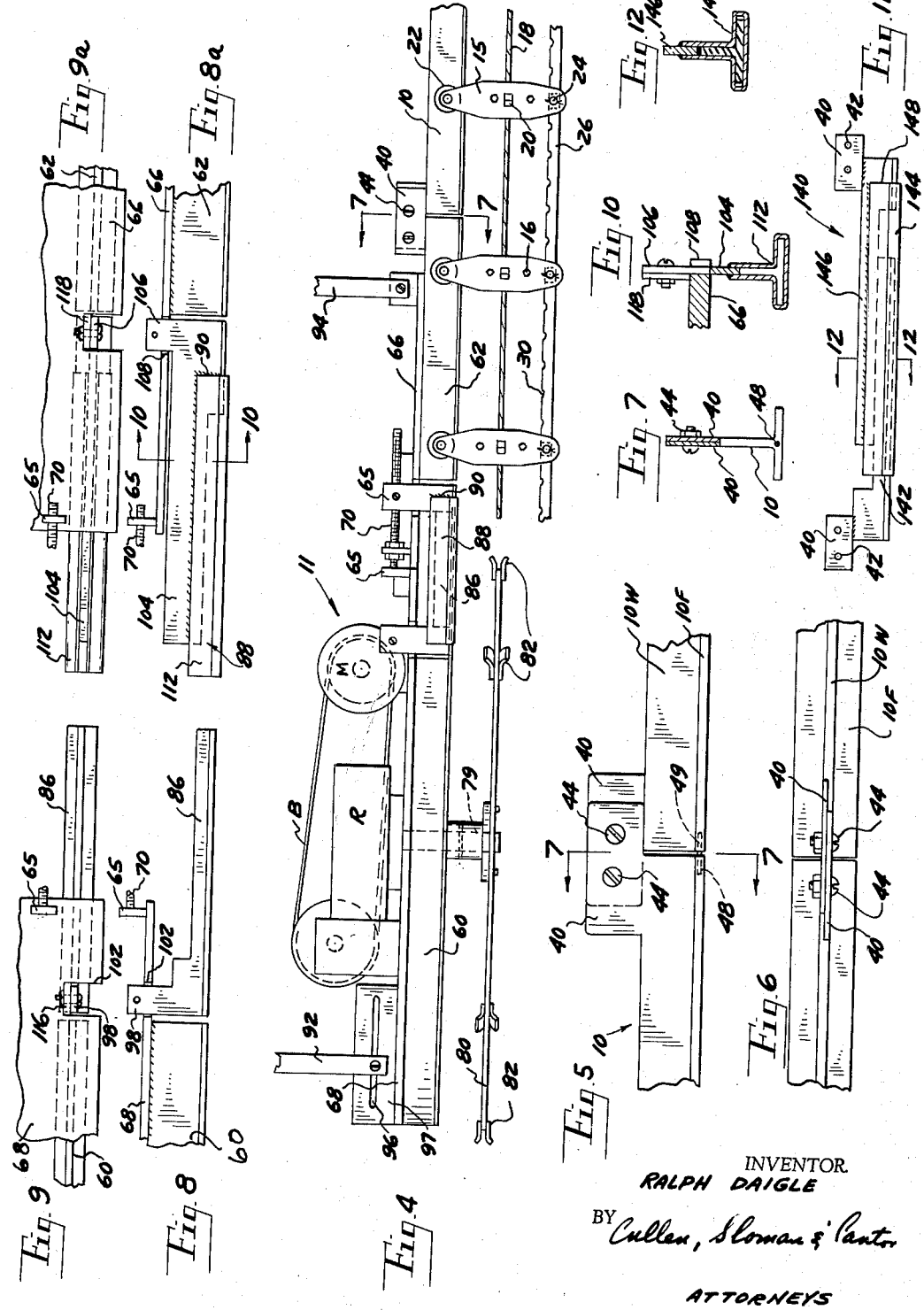
INVENTOR.
RALPH DAIGLE
BY Cullen, Sloman & Cantor
ATTORNEYS

United States Patent Office 3,179,452
Patented Apr. 20, 1965

3,179,452
CONVEYOR TRACK AND DRIVE ASSEMBLY
Ralph Daigle, Detroit, Mich., assignor to My-T-Veyor Corporation, Oxford, Mich., a corporation of Michigan
Filed Dec. 7, 1962, Ser. No. 243,132
6 Claims. (Cl. 287—103)

This application relates to conveyors and has for its principal object the provisions of a novel, low cost conveyor made of sections to be sold pre-fabricated and easy to install and maintain, with minimum engineering, and minimum use of minimum quality labor, particularly useful in such diverse applications as paint lines, delivery lines, cleaning plants, progressive fabricating and assembly, overhead storage, dipping processes and others.

Particularly is it a light duty conveyor which is quickly assembled in any layout as desired from standard stock parts and is aptly described as a "do it yourself" conveyor which can be engineered and installed at minimum expense and thus save on expensive engineering and erection costs, without requiring specialized engineering services or indefinite waiting for deliveries of specially engineered parts.

The conveyor system hereof is characterized by the fact that the pre-fabricated standardized parts may be stocked at local mill supply houses for immediate availability which can be acquired and installed and put into operation in a minimum time and without requiring storage of parts and tie-up of production while waiting for special parts to be provided.

The conveyor system hereof is designed for fast simple bolt together erection with no welding necessary and without requiring special tools.

It is completely flexible and can be hung from any kind of structure as well as mounted, if desired, from the floor of a building. All parts such as drives, turns, dips, straight rail parts, expansion joints and the like, may all be bolted together in any desired arrangement and the simplicity of design permits quick disassembly for rearrangement or removal or changes of elevation or additions to the system.

It is a simple and trouble free design consisting of inverted T-track sections which act as rails for conveyor trolleys which are joined together by short flexible wire connectors. Loads may be hung from these trolleys directly or from straight rigid load bars connecting the trolleys and suspended between successive trolleys.

The system has been completely designed and fabricated and tested and includes such elements as standard track sections in a variety of standard lengths such as five foot sections, four foot sections, etc., ranging down to one foot sections. The system also includes expansible sections for odd dimension fill ins adjustable from zero to eight inches and equipped with expansible connectors. The system also includes stock turns which are available for a variety of angular dispositions on large radii.

The trolleys of the system are rugged yet simple of construction and in the example shown are of a size and quality so as to be rated at 25 pounds capacity per trolley but in actual use considerably larger loads may be handled as desired without danger.

The trolleys are connected by standard flexible wire or cable connectors available in stock lengths, for example, six, twelve and eighteen inches. The connectors are strong wires as, for example ⅛ inch aircraft cable, and have buttons on their ends firmly swedged to the wires.

The lower ends of the trolleys are connected by short rigid load bars which enable loads to be suspended between trolleys. In a suitable example the load bars are notched at one inch increments which means that six loads per trolley may be spaced along the system. This is particularly desirable when the system is used in dry cleaning establishments since it provides a spacing as low as one inch between garments hung from the system.

The design of the trolleys is such that despite that the load bars are straight and rigid, nevertheless these load bars will negotiate all turns and dips in the system because the load bars are designed to "chord the circles" defined by the outer surfaces of the idler wheels at the turn.

The drive means for the system is fabricated as a unitary pre-fabricated packaged drive unit adapted to be mounted on the track at a suitable drive location and the drive unit includes all the necessary and desirable parts for drive such as a low capacity electric motor and a suitable speed reducer connected by a belt and pulley to such motor, with the shaft of the speed reducer fixed to a main drive wheel whose sprockets engage the trolleys and move the connected trolleys, their connecting wires, and their connecting load bars completely around the track. The drive unit is formed complete with the necessary and desirable takeup adjustments, the drive sprocket wheel and connectors for insuring proper connecting and mounting of the drive unit. The drive unit is so designed that it may be formed and used optionally as desired at a 90 degree or 180 degree turn in a system. It is pre-fabricated and unitary and may be put into service merely by being properly lubricated at the time and place of installation.

The drive unit contains its own lengthwise adjustment features and its own expansible connectors which will later be described in detail, it being here stated however that the drive unit hereof and particularly the expansible connectors are so designed and installed at the factory for clockwise conveyor travel. Should counterclockwise travel be desired, it is necessary simply to open up the takeup adjustment of the drive unit and rearrange the expansible connectors by reversing or relocating them on opposite sides of the track and then closing up these expansible connectors and completing the necessary adjustments to insure the drive unit being installed properly for counterclockwise travel rather than clockwise travel and originally designed.

While conveyor systems have been known, the conveyor system hereof is believed to be novel and desirable for reasons described above as well as because of the presence of certain novel features in and of themselves valuable but which combine to form a novel and desirable conveyor system herein illustrated.

Among these features are the following.

The track is formed of standard sections with novel end to end joints having aligning pins and sockets and having offset connector plates formed with two pairs of holes whereby one pair is always available for bolting the track sections end to end even though the other pair of these two holes may, in certain instances, be used to connect the track to a supporting member at the joint.

Another feature is the provision of the drive means as a pre-fabricated package or unit. This comprises a movable drive plate above the track and which can be adjusted longitudinally of the system as desired. The drive plate has a longitudinally slotted hanger to which a support member may be bolted for adjustably supporting the drive plate and the latter carries its own motor, reducer, pulleys and belt and drive sprocket wheel. The shaft of the drive reducer is extended below the drive plate so that its lower end is available to mount and rotate the horizontal drive sprocket wheel below the drive plate whose sprockets engage the trolleys and drive them. In the embodiment here disclosed, all of the drive parts except the drive sprocket wheel are above the drive plate for easy access and exposure for installation, adjustment, or repair as desired. The drive plate is longitudinally adjustable and is held firmly in its longitudinally adjusted position by U-shaped hold down clamps which fasten and aline the drive plate adjustably to a fixed plate fixed to the track, the adjustments including adjusting screws.

Each drive unit comes equipped with its own two expansible connectors. Each connector is welded or ground at one end to a bevel for smooth one-way travel or trolleys and thus insure against the trolley system binding or stopping at the drive unit. The drive means is sold as a unit as specified and is mounted for clockwise conveyor travel to receive trolleys running off one of the connectors around the drive wheel and then running onto the other connector. Now if the customer wants counterclockwise travel, he reverses or rearranges the connectors of the drive unit on the opposite sides of the track to enable the connectors to operate as described above despite change in the direction of travel.

Aonther and most important novel feature is the feature which insures minimum flexing of the wire connectors as they make turns and this is particularly important where there are numerous turns and changes in direction and most particularly important where the turns and changes of direction reverse themselves from point to point so as to cause flexing of the wires, it being well known that repeated flexing of the wires causes wire fatigue and stretch and breakage. The system hereof reduces wire flexing to a minimum and this is particularly important where the system includes closely spaced trolleys as is the case here. To obtain this result, the trolleys are designed so that the axes of the wires used therewith are at minimum horizontal distances from the vertical bearing surfaces such as the nut heads of the trolleys as the latter turn on flat faced idler wheels at changes of direction. This minimum distance insures minimum flexing of the wires as the trolleys change direction. In the specific instance illustrated, the wire axis departs no more than a minimum distance specified from the circle defined by the outer or flat face of an idler wheel at a change of direction. This contrasts from what would be the situation if thick trolleys were employed with a considerably greater distance between the bearing surfaces of the trolleys on the idler wheels and the axes of the wire connecting the trolleys. In the system hereof, the idler wheels are flat faced and the trolleys are so thin that a minimum distance exists between the wire axis and the bearing surfaces of the trolleys as the trolleys move around the flat faced idler wheel.

The system hereof favorably contrasts with known systems which employ gapped idler wheels in whose gaps trolleys seat as they move around the idler wheels. The latter system is expensive to maintain because of the difficulty of maintaining proper alinement of the trolleys necessary to enable the trolleys to fit properly in the gaps of the idler wheels. No such requirement exists here because of the use of flat faced idler wheels and minimum lateral spacing between the bearing surfaces of the trolleys riding on these flat faces of these idler wheels and the axis of the wires connecting the trolleys.

A still further novel feature is the construction which enables straight rigid load bars to be used connecting closely spaced trolleys. The construction hereof is such that the load bars "chord the circle" of the idler wheels without interference. The load bars have longitudinally slotted holes at their ends which are as close to the ends of these bars as possible and which enable the load bars to fit loosely on load or clevis pins of the trolleys to enable straight rigid load bars to be used in a continuous system without interference. These straight rigid load bars may be use to support numerous loads between trolleys and in a specific instance where the trolley spacing is six inches and the load bars are correspondingly six inches in length, the load bars are notched at one inch increments for receiving six uniformly spaced loads on one inch increments despite that the trolley spacing is six inches. In other words, six times as many loads can be handled with uniform spacing in a system employing load bars as would be the case if the loads had to be mounted on the trolleys directly and this is particularly desirable in dry cleaning establishments so that six times as many garment hangers can be handler on uniform one inch spacing as would be provided if the garment hangers were suspended directly from the trolleys and if no load bars were used.

Still another feature is the provision of two angle shaped filler strips where the track has a top rail at a dip or curve in a vertical plane and this is described here. Where two sections of track join and each section has a top rail because it is part of a vertical curve, the connector plates of these two pieces of track join the two sections of track but the top rail is cut away at the joint. Now for purposes of filling in the cut-away of the top rail, there is used two angle shaped filler pieces which bolt to the connector plates on the outside of the connector plates and thus fill in the gap of the top rail of the track.

The foregoing and still further objects and advantages of the system hereof may best be understood upon reference to the appended drawings disclosing one such system, by way of example.

In these drawings; wherein the separate figures are drawn to a variety of scales:

FIG. 2 is a cross-section view particularly showing a trolley as it rides on a track and as it engages an idler wheel at a turn.

FIG. 3 is a side view.

FIG. 4 is an elevation view of a drive unit per se with sections of track joined to and by it.

FIG. 5 is an elevation view at a joint between track sections.

FIG. 6 is a plan view at such joint.

FIG. 7 is a transverse section view as if on lines 7—7 of FIGS. 4 and 5.

Figure 1:
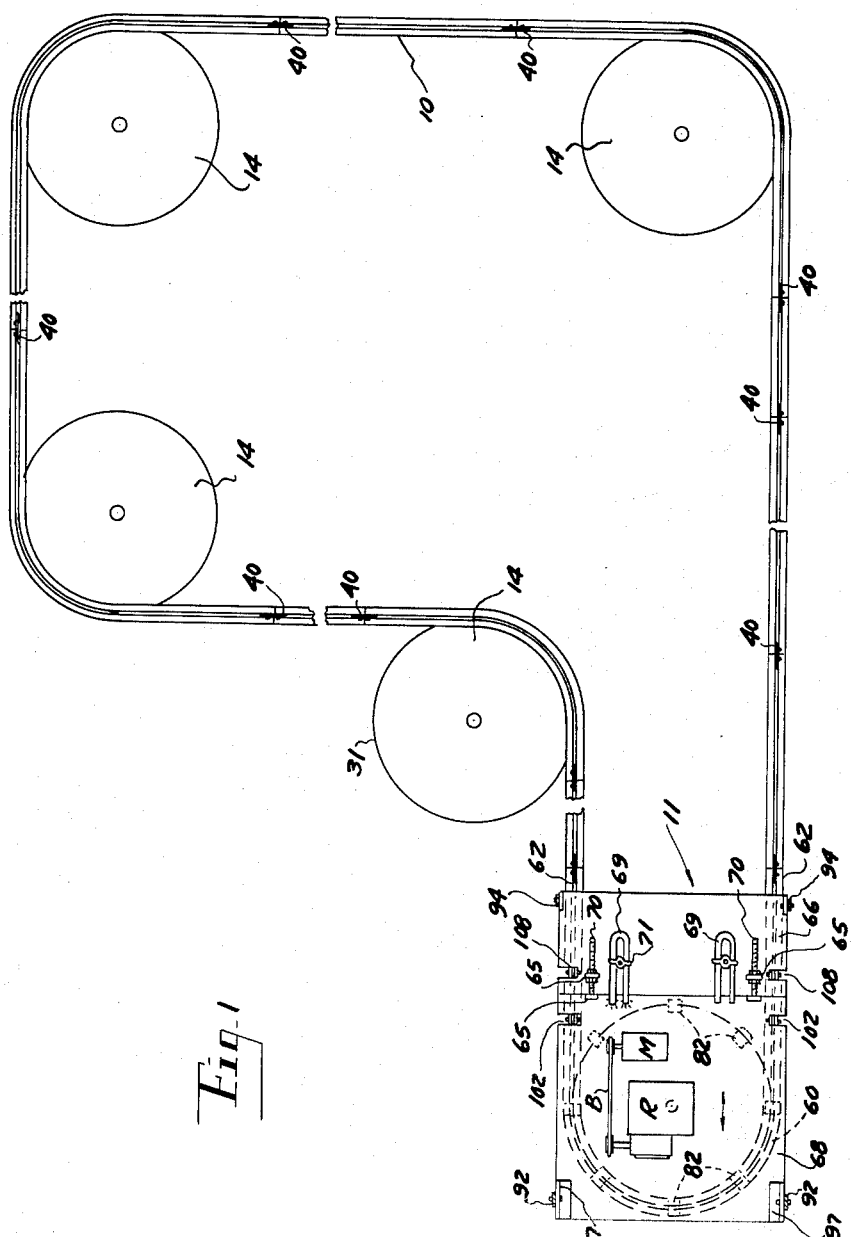
FIG. 1 is a plan view of a typical system.

FIGS. 8 and 8A shown in elevation male and female members of a connector part of the drive unit.

FIGS. 9 and 9A are top plan views illustrating the functioning of the connector parts of the drive unit.

FIG. 10 is a transverse section of a female connector as if on line 10—10 of FIG. 8A.

FIG. 11 is an elevation view of an expansible track section.

FIG. 12 is a section view on line 12—12 of FIG. 11.

FIG. 13 shows a dip or vertically curved track in elevation.

FIG. 14 is an elevation view of a curved track section.

FIG. 15 is a top plan view of such curved track section.

FIGS. 16 and 17 are section views on lines 16—16 and 17—17 of FIG. 13.

The system (FIG. 1)

Referring to the drawings, these show in FIG. 1 an inverted T-shape track 10 around which trolleys ride, such track having a flange 10F and a web 10W (FIG. 2).

Two adjacent ends of track 10 are bridged and connected by a drive unit 11 which will later be described in detail.

At such change in direction or turn in the track is suitably mounted a flat faced idler wheel 14 against which bears bearing surfaces of trolleys 15 (FIG. 2).

The trolleys (FIGS. 2–3)

Such bearing surfaces are provided by flat faces of nuts 16 which join halves of the trolleys and clamp and lock between these halves ends of short pieces of flexible connector wires 18, these having buttons 20 swedged thereon and seating between trolley halves to interlock ends of wires to trolleys, clamping being effected by nuts 16 on bolts 21. At upper ends of the trolleys are rollers 22 riding on T-shaped track 10. At lower ends of the trolleys are transverse load supporting or clevis pins 24 connected if and as desired by short lengths of rigid straight connecting or load bars 26, these having at their ends slotted holes 28 loosely receiving clevis pins 24. These load bars also have notches 30 in their upper edges for spacing and receiving loads between trolleys to multiply the number of loads per trolley.

Turns (FIGS. 1-2)

As trolleys ride around the track they are guided at turns by idler wheels 14 on whose flat faces 31 ride bearing surfaces of trolleys, the flat faces of nuts 16. The trolleys are so designed as to establish at a minimum, the horizontal distances between the axes of wire connectors 18 and the faces of nuts 16 so as to cause a minimum amount of departure of wire connectors 18 from the true circles defined by the outer faces of idler wheels 14 and thus a minimum amount of flexing of wires 18.

As the trolleys move around turns, load bars 26 "chord" the circles" defined by the outer faces of idler wheels 14. Shifting of load bars 26 is insured by the looseness of the connections between load bars 26 and clevis pins 24 of the trolleys, holes 28 in load bars 26 receiving pins 24 being slotted and oversize.

Track joints (FIGS. 5-6-7)

The track is made of sections joined end to end and a suitable joint will now be described. At opposite ends of web 10W of the track section are offset joining plates 40 (FIGS. 5-6-7) above and in line with such webs and overlapping adjacent track sections for joining them end to end.

Each joining plate has two holes 42 (FIG. 14) for receiving transverse bolts 44 when plates 40 are overlapped with four holes alined in two pairs. Because there are two pairs of holes and bolts 44 at each joint, it is possible to use one pair of holes and bolts for fastening track sections at a juncture to vertical hangers such as straps with the track sections nevertheless held joined by the remaining pair of holes and bolts.

Each section of track at opposite ends of its horizontal flange has an alining pin 48 and an alining socket 49 for receiving such a pin on an adjacent section whereby sections are alined end to end by cooperation of the pins and sockets of adjacent sections.

Dip or vertically curved track (FIGS. 13-17)

Where a track section is vertically curved to provide a dip or vertical curve, the track section has not only the lower horizontal flange 10F and the vertical web 10W, but also a top guiding rail 50 which terminates at two joining plates 40 of that section. To fill the gap at the point where two joining plates 40 overlap at a joint between two curved track sections, two L-shaped filler pieces 52, FIG. 17, are secured to the joined plates 40 by the bolts 44. The horizontal flanges 53 of these L-shaped filler pieces 52 fill the gap between adjacent rails 50 of adjacent curved track sections.

Drive unit (FIGS. 1, 4, 8, 8A, 9, 9A, 10)

A most important feature of the system hereof is the provision of a pre-fabricated, pre-packaged drive unit 11 which can be installed as a unit in a track system and which is ready for use immediately upon installation. The drive unit 11 (FIGS. 1 and 4) has connectors (FIGS. 8 to 10) and includes a double ended horizontal curved three piece section of track along which the trolleys move.

If the turn is 180 degrees, as shown, the track section includes a U-shaped piece of track 60 and two end pieces 62. However, if the drive unit is to be installed at a 90 degree turn, the drive unit includes a curved half U center piece of track and two end pieces.

End pieces 62 will be coupled or joined at their ends to standard sections of track and are formed at such ends in accordance with the joining means shown in FIGS. 5-7 with joining plates of the same type as are provided on the ends of standard sections of track.

The drive unit includes a fixed plate 66 above and fixed to the end pieces 62 and bridging them.

The drive unit also includes a movable plate 68 above and secured to the U-shaped center piece of track 60 and bridging its ends. Screw bolts 70 (FIG. 1) adjustably connect upstanding lugs 65 of the two plates 68 and 66 so that the movable plate 68 may be moved longitudinally for adjustment towards and away from the fixed plate 66 and thus towards and away from the fixed track comprising the standard sections and the fixed end pieces of track 62. The screws 70 comprise an adjustment means for connecting the two plates 66 and 68 and are constructed to be manually adjustable for moving the movable plate towards or away from the fixed plate and for thus shifting the drive parts on the movable plate 68 with respect to the fixed parts of the track.

For helping to secure the two plates 66 and 68 of the drive unit properly alined, holddown clamps 69 are provided, these being held down by means of bolts 71 securing them to the fixed plate 66, and these clamps hold down the movable plate 68 of the drive unit.

The drive parts (FIG. 1) include a conventional motor M, a speed reducer R, and a belt B and pulleys connecting them. The vertical shaft 79 (FIG. 4) of the speed reducer R passes downward through a hole in the movable plate 68 and to its lower end is fixed a drive sprocket 80 which is below the movable plate 68 and which drives the trolleys by the engagement of the sprockets 82 with the spaced trolleys.

The U-shaped center piece of track 60 is adjustably connected at its ends to the two fixed pieces of track 62 by means of expansible and reversible male and female connectors (FIGS. 8 to 19), and the female connectors 88 have bevelled lead portions 90 arranged so as to be presented to the trolleys as these move towards the the connectors. The connectors include the male connector 86 and the female connector 88, one on each side of the track, there being two male connectors 86 and two female connectors 88 in the system. The connectors are removable and reversible so as to accommodate to a change in direction of drive.

Hangers 92 and 94 (FIG. 4) are connected to the movable plate 68 and the fixed plate 66 respectively for supporting the drive unit directly with the necessary adjustment being provided by the longitudinal slots 96 which receive the lower ends of the hangers 92 and which are in lugs 97 of the drive plate 68.

Each of the two male connectors 86 (FIG. 8) is a track shaped male blade 86 having a lug 98 fitting in a notch 102 at the edge of the movable plate, there being two such notches and two such blades 86. Each of the two female connectors 88 comprises a blade 104 whose lug 106 fits in a notch 108 in the edge of fixed plate 66 and each blade 104 has welded to it a track shaped sleeve 112 for removably receiving a male blade 86. The two blades 86 and 104 are removably mounted on the plates by means of plate lugs 116-118 at the plate notches 102-108 bolted to the blade lugs 98-106.

The mounting arrangements are identical to enable either a male blade or the blade of a female connector to be mounted at either side on either plate to accommodate to a change in direction of drive and to present the bevels 90 of the connectors to the trolleys regardless of the direction of drive.

Track expansible section (FIGS. 11-12)

The catalog of track sections includes an expansible section 140 having conventional joining plates at its ends and formed as a track shaped male blade 142 and a track shaped female sleeve 144 welded to a blade 146 with a ground bevel at 148.

This completes the detailed description of the parts whose objects and advantages have previously been described. Having described the parts in detail, I now refer to the claims for a determination of the scope of the invention of this application.

I claim:
1. A sectional track of T cross-section comprising two T sections joined end to end with web vertical and with flange below it and horizontal; each track section having an offset joining plate above and in line with its web and overlapping the two track sections; the two joining plates being overlapped for joining two sections end to end; and each plate having two holes for transverse bolts when the plates are overlapped with four holes alined in two pairs.

2. A track according to claim 1 wherein each section end has an alining pin and a registering alining socket in the ends of its flange.

3. A track according to claim 1 wherein each track section has a top guiding rail terminating at the joining plate, and two L-shaped filler pieces secured to the joined plates and filling the gap between the rails.

4. A track according to claim 1, wherein each section has an aligning projection at one end and a registering aligning socket at its other end, and wherein the projection of one section interlocks with the socket of an adjacent section.

5. An expansible track section of inverted T form having a web and a flange, the section comprising two connectors of track form, each having a joining plate at the end of and above its web; one connector being a male blade of track form; the other being a blade to which is welded a female sleeve of track form adapted to movably receive the male blade.

6. A sectional track comprising two sections joined end to end and including a vertical web and at least one horizontal web, each track section having an off set joining plate above and in line with its web and overlapping the two track sections; the two joining plates being overlapped for joining two sections end to end; and each plate having two holes for transverse bolts when the plates are overlapped with four holes aligned in two pairs, each section having an aligning projection at one end and a registering aligning socket at its other end, and wherein the projection of one section interlocks with the socket of an adjacent section.

References Cited by the Examiner
UNITED STATES PATENTS

| | | | |
|---|---|---|---|
| 650,665 | 5/00 | Andrews | 287—103 |
| 1,875,535 | 9/32 | Whitney | 104—91 |
| 2,057,173 | 10/36 | Woalkes | 198—203 |
| 2,344,476 | 3/44 | Turnbull | 198—177 |
| 2,539,078 | 1/51 | Henderson | 287—64 |
| 2,574,648 | 11/51 | Mason | 287—2 |
| 2,855,090 | 10/58 | Zebley | 198—177 |
| 2,869,709 | 1/59 | Zebley | 198—177 |
| 2,899,072 | 8/59 | Weiss | 198—177 |
| 2,931,486 | 5/60 | Zebarth | 198—203 |
| 3,000,656 | 9/61 | Hollaender | 287—2 |

ERNEST A. FALLER, *Primary Examiner.*

WILLIAM B. LA BORDE, *Examiner.*